United States Patent [19]

Smith et al.

[11] Patent Number: 5,505,502

[45] Date of Patent: Apr. 9, 1996

[54] MULTIPLE-SEAL UNDERWATER PIPE-RISER CONNECTOR

[75] Inventors: James D. Smith; Stewart A. Fox; William T. Asbill, all of Houston, Tex.

[73] Assignee: Shell Oil Company, Houston, Tex.

[21] Appl. No.: 74,236

[22] Filed: Jun. 9, 1993

[51] Int. Cl.⁶ .................................................. F16L 15/04
[52] U.S. Cl. ........................................ 285/334; 285/351
[58] Field of Search ................................. 285/333, 334, 285/351

[56] References Cited

U.S. PATENT DOCUMENTS

| | | | |
|---|---|---|---|
| H1,329 | 7/1994 | Bailey et al. | 285/333 |
| 2,110,825 | 3/1938 | Archer | 285/334 |
| 2,150,221 | 3/1939 | Hinderliter | 285/333 |
| 3,572,771 | 3/1971 | Redwine | 285/333 |
| 3,822,902 | 7/1974 | Maurer et al. | 285/333 |
| 4,076,436 | 2/1978 | Slator et al. | 285/333 |
| 4,192,533 | 3/1980 | Blose | 285/334 |
| 4,429,904 | 2/1984 | Reimert . | |
| 4,438,953 | 3/1984 | Timme, Jr. | 285/333 |
| 4,509,777 | 4/1985 | Walker . | |
| 4,538,840 | 9/1985 | De Lange . | |
| 4,595,219 | 6/1986 | Lenze et al. | 285/333 |
| 4,601,491 | 7/1986 | Bell, Jr. et al. | 285/334 |
| 4,610,467 | 9/1986 | Reimert . | |
| 4,643,467 | 2/1987 | Wood . | |
| 4,648,628 | 3/1987 | Meadows et al. . | |
| 4,706,011 | 11/1987 | Vergara et al. . | |
| 4,717,183 | 1/1988 | Nobileau . | |
| 4,813,717 | 3/1989 | Watts . | |
| 4,892,337 | 1/1990 | Gunderson et al. . | |

FOREIGN PATENT DOCUMENTS

| | | | |
|---|---|---|---|
| 654678 | 12/1962 | Canada | 285/333 |
| 292464 | 11/1988 | European Pat. Off. . | |
| 2438387 | 2/1976 | Germany | 285/333 |
| 1017763 | 1/1966 | United Kingdom | 285/333 |
| 2064041 | 6/1981 | United Kingdom . | |
| 2152168 | 7/1985 | United Kingdom | 285/333 |
| 8503757 | 8/1985 | WIPO . | |

*Primary Examiner*—Eric K. Nicholson
*Attorney, Agent, or Firm*—Mark A. Smith

[57] ABSTRACT

A rugged screw-threaded pipe connector for handling corrosive or contaminating fluids under high pressure in a pipeline or pipe riser surrounded by a body of water and subject to high static or dynamic stresses and bending forces. The connector is provided with coarse threads having stabbing flanks and with load flanks adapted to support high loads. The connector is provided with multiple sealing means arranged within the body of the connector that isolate the threads from fluids outside the connector or within the bore of the connector.

14 Claims, 2 Drawing Sheets

MULTIPLE-SEAL UNDERWATER PIPE-RISER CONNECTOR

FIELD OF THE INVENTION

This invention is directed to threaded connectors or couplings to be used in connecting together adjacent sections of pipe in a conduit or pipeline, or in a tubular pipe riser in an underwater environment. More specifically, the invention is directed to a threaded connector having multiple independent pressure-responsive seals, axially displaced from the seal formed by the engaged threads, to isolate the threads from fluids within and/or surrounding the pipe-riser threaded connector.

BACKGROUND OF THE INVENTION

In offshore floating production operations, a pipe riser provides a conduit for producing a fluid from a well, drilled in the ocean floor, to an oil and/or gas production facility at the ocean surface. Alternatively, a pipe riser may provide a conduit for exporting fluid from an offshore facility to the seafloor for further transport via an underwater pipeline to other locations. The static and dynamic load applied to each threaded connector in a pipe riser may be substantial, especially in water depths of three thousand feet or more. Furthermore, multiple seals are required to prevent escape of inner fluids or ingress of external fluids. The production pipe riser is connected at its lower end to a subsea production wellhead and at its upper end to a floating production vessel equipped to handle, store, separate or treat the well production fluid in a manner well known to the art. Alternatively, the pipe riser may be connected at its upper end to a floating production vessel and at its lower end to a subsea pipeline for export of fluids from the floating production vessel or offshore platform. The weight of the pipe riser and the production fluid contained therein may be supported by large tensioners located on the floating vessel. The tensioners also compensate for movement of the anchored vessel due to the action of wind, waves, tides, etc.

The production pipe risers that are supported from a floating facility may be unsupported against lateral movement which is caused by the lateral movement of the floating facility on the ocean surface. Such movement may cause tensile and bending stresses resulting in sea water outside the pipe riser attacking the threaded portion of the connector, or production fluid under pressure within the pipe riser escaping through a damaged connector to contaminate the ocean in the vicinity.

SUMMARY OF THE INVENTION

It is a primary object of the present invention to provide a threaded pipe connector provided with pressure-actuatable seals within the body of the connector and at both ends of the threads to prevent fluid from coming in contact with the threads of the connector inside the bore of the connector, or outside, or surrounding the connector.

Another object of the present invention is to provide a box-and-pin type threaded connector equipped with thread-load relief or redirection means provided in the wall of the pin and of the box at the point adjacent the larger-diameter threads of the pin and the smaller-diameter threads of the box, whereby all of the threads of the pin and box are in axial load-sharing engagement.

Still another object of the present invention is to provide a rugged, stab-type, threaded, pin-and-box pipe connector provided with inner and outer seals in the connector body while having a bore equal to that of the adjacent sections of a pipeline.

A further object of the present invention is to provide a pin-and-box type pipeline connector having multiple seals, which connector can be quickly screwed together and the multiple seals engaged in a single operation.

It is another object of the present invention to provide a pipe connector with a smooth bore equal to that of the pipe in which it is installed so that a smaller-diameter pipe may be run through the connector or withdrawn from a pipeline without hanging up on a pipe connector.

Another object of this invention is to provide a pin-and-box type threaded pipe connector with means to prevent the pin from backing out of the box under normal conditions of use except when it is desired to remove the pipe from its location.

Still another object of the present invention is to provide a pin-and-box type threaded connector with metal-to-metal holding or anchoring means carried by the pin and/or the box, independent of the cooperating threads thereof, to preclude or greatly reduce any tendency of the pin to back out of the box when the connector is subjected to bending and other stresses when vertically or otherwise positioned in a riser pipe at an offshore location. This feature is also attractive for seafloor pipelines which are laid in a non-straight fashion. Cyclic pressure and temperature fluctuations in a pipeline will cause a threaded connector to try to "unscrew" unless otherwise locked in place.

The present invention relates to a pipe connector of the pin and box type. The pin is adapted to be connected, as by welding, to one end of a pipe section of a pipeline. The connector box, in turn, is adapted to be connected to the end of another pipe section so as to connect to a pipe section having a pin. The bore of the pipe connector and that of each pipe section is the same so that smaller-diameter tools, instruments, or pipe do not hang up on the connector when being run or lowered therethrough or withdrawn therefrom.

The threads of the pin and box are cut to have a substantially radially-directed load flank and an angled stabbing flank of from 30 to 50 degrees to the connector axis, preferably, say, 45 degrees. Thread-load redirection grooves are provided in the adjacent walls of the pin and box at a point axially displaced from the ends of the pin and box.

The walls of the connector are substantially thicker than the walls of the pipe sections to which the pin and box are connected. The outer wall of the pin is reduced in diameter to form a torque shoulder against which the nose of the box, or a lip formed thereon, is seated when the pin is threaded into the box and torqued-up a selected amount.

When the pin and box threads are engaged, the connector, inside its body, is provided with seal means at both ends of the threads to protect the threads from any corrosive fluid, e.g., sour oil and/or gas, passing through the bore of the connector, and from any fluid, e.g., sea water, outside the connector body. The seal means include at least one metal-to-metal seal. The metal-to-metal seals also form holding or anchoring means between the pin and box so as to prevent the pin from being unscrewed from the box by stresses encountered during normal usage. Other features of the connector are provided for the same purpose.

BRIEF DESCRIPTION OF THE DRAWINGS

The objects of the present invention will be more fully understood by a detailed description of the connector of the subject pipe connector when taken with reference to the drawings, wherein.

DESCRIPTION OF THE INVENTION

Figure 1:
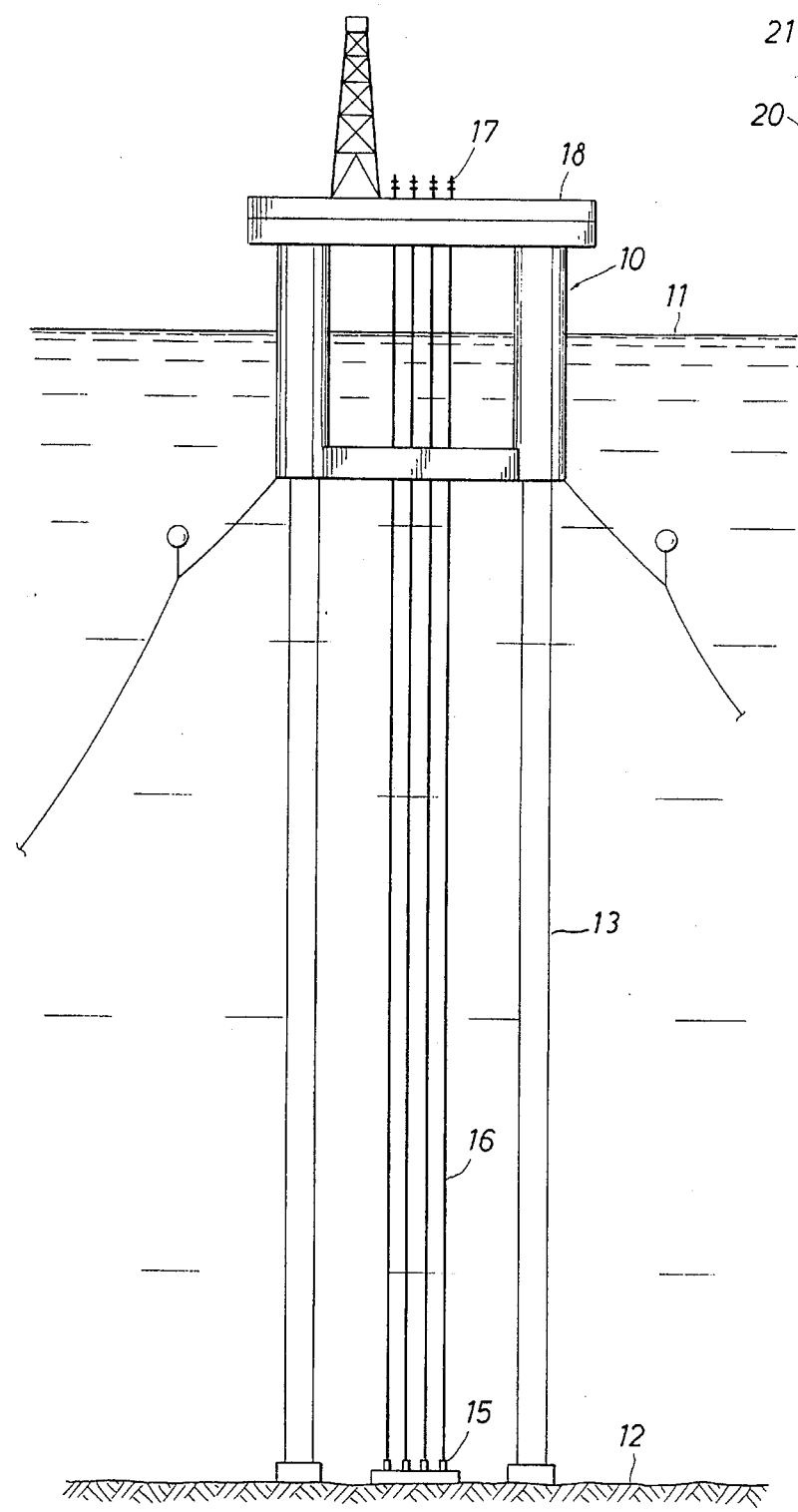
FIG. 1 is a diagrammatic view of a tension leg platform anchored to the ocean floor in water 1,000 to 6,000 feet deep.

Referring to FIG. 1 of the drawing, a tension leg platform 10 of the type used in the drilling and production of oil and gas from offshore underwater petroleum reserves is illustrated as floating in a body of water 11 being anchored to the ocean floor 12 by a series of tendons or tethers 13 extending between the buoyant platform 10 and suitable anchoring bases 14 on the ocean floor 12 in a manner well known to the art. The anchoring tendons 13 may take the form of cables or large diameter pipe, say, 20–40 inches in diameter, and extending for 1,000 to 6,000 feet to the ocean floor.

A plurality of wells 15 have been drilled in the ocean floor 12 in any suitable manner well known to the art. Production fluid from each well 15 is conveyed from the ocean floor well 15 through a production pipe riser 16 to a flow-control production fluid wellhead 17 located on a deck 18 of the floating platform. The buoyancy of the platform 10 is employed to keep the upper ends of pipe risers 16 in a substantially vertical position as well as to support catenary pipelines or risers (not shown). It is to be understood that tensioning equipment (not shown) may be mounted on the platform 10 and connected to the pipe risers 16 to adjust the tension on the pipe risers 16. A production fluid pipe riser 16 takes the form of an elongated hollow conduit at least as long as the water depth and is made up of a plurality of sections of pipe connected together end-to-end by means of a coupling or pipe connector. The connector of the present invention is a preferred example. A typical pipe riser 16 used at an offshore location between an ocean floor wellhead 15 and the platform may be 9-5/8 inches in diameter. A larger diameter riser (not shown) using the same type of connectors would be used to transport oil from the deck 18 of the platform 10 down to the ocean floor 12 and thence to shore or to a collection terminal. The sections of pipe making up a riser would be of a length suitable for handling offshore, say, from 20 feet to 100 feet. Each pipe section in the riser 15 would have a pin secured to one end, as by welding, and a mating box member secured to the other end in the same manner.

Figure 2:
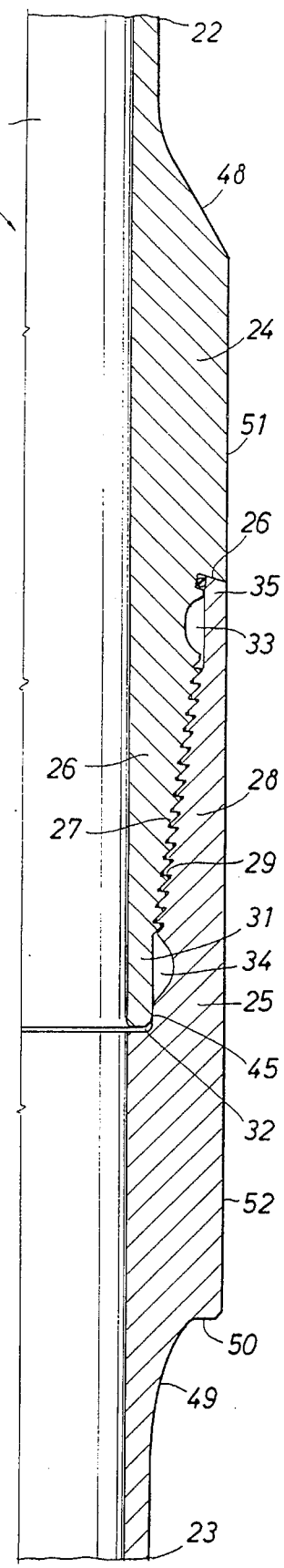
FIG. 2 is a view, taken in longitudinal cross section, showing one half of the connector of the present invention to be used in the production pipe risers of a tension leg platform.

Referring to FIG. 2 of the drawing, a longitudinal cross-sectional view of the pipe connector 20 is shown, having a bore 21 therethrough which is the same diameter, at ends 22 and 23 of the pin 24 and box 25, as that of the riser pipe sections to which it is secured, as by welding. A central tapered portion 26 of the pin 24 is provided with a thread 27 which is adapted to mate in screw-threaded engagement with a central tapered bowl portion 28 of the box 25 which is provided with a thread 29.

A thin-walled sealing extension or lip 31 at the nose of the pin 24 extends axially into a bore area 32 of enlarged diameter 32 in the box. Axially displaced from the thick-walled threads 27 and 29 of the pin 24 and the box 25, recessed circumferential thread-load redirection grooves 33 and 34 are provided in the walls of the pin 24 and the box 25. These grooves are similar to one described in U.S. Pat. No. 4,892,337 to Gunderson et al. and are employed to distribute the axial load stresses over the threads 27 and 29 when they mate in an operational mode, as shown in FIG. 2 hereof. The thread-load redirection grooves 33 and 34 may have rounded or elliptical walls and be of a depth about twice as great or more as the radial extension of the load flanks of the threads.

At the nose end of the box 25 is another thin-walled sealing extension or lip 35 (FIG. 3) recessed within the body of the connector which extends axially past the pin (24) thread-load redirection groove 33 to cover the redirection groove 33 and contact a preload or interference shoulder 36 formed in the wall of the pin 24. The nose end 37 of the lip 35 contacts the surface of the shoulder 36 on the pin to form a face seal or axial compression seal within the body of the connector to aid in preventing the intrusion of sea water into the thread area of the connector.

Figure 3:
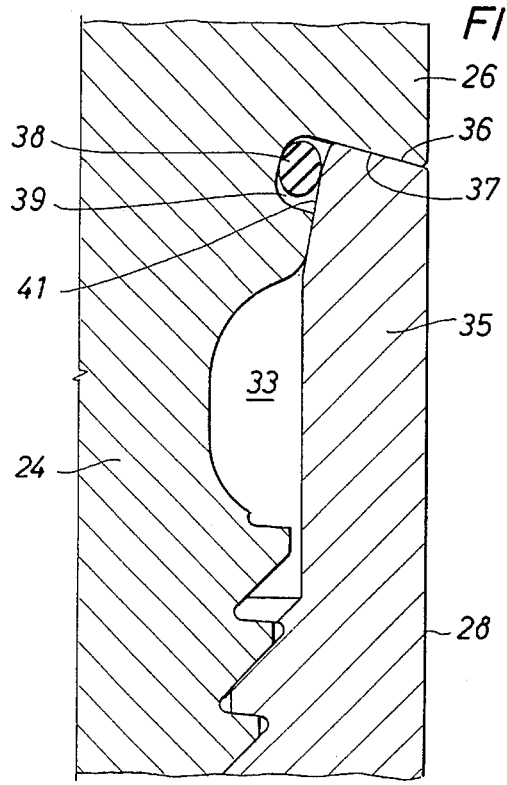
FIG. 3 is a view, taken in enlarged cross section, of the nose end of the box of the present connector of FIG. 2 when seated in axial preloaded condition against the torque shoulder of the pin.
Figure 5:
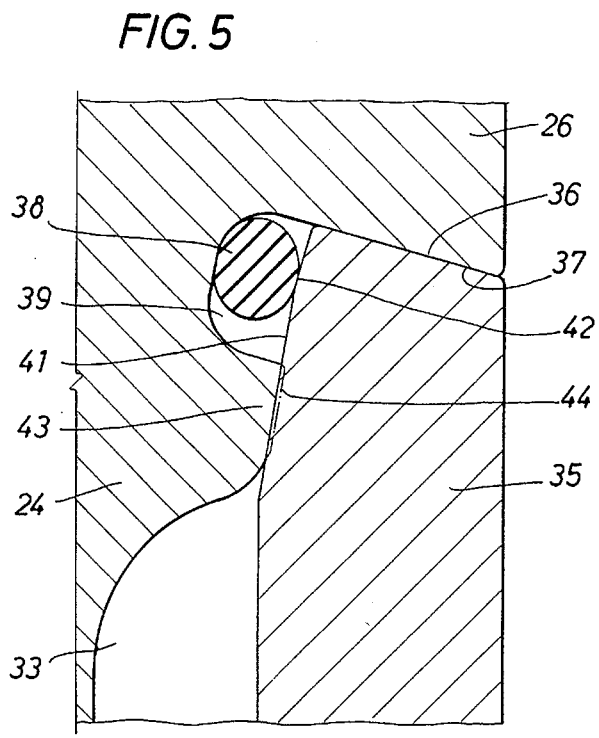
FIG. 5 is a view, taken in enlarged cross section, of the sealing of FIG. 3 between the nose of the box of the connector and the mating pin in preloaded condition.
Figure 6:
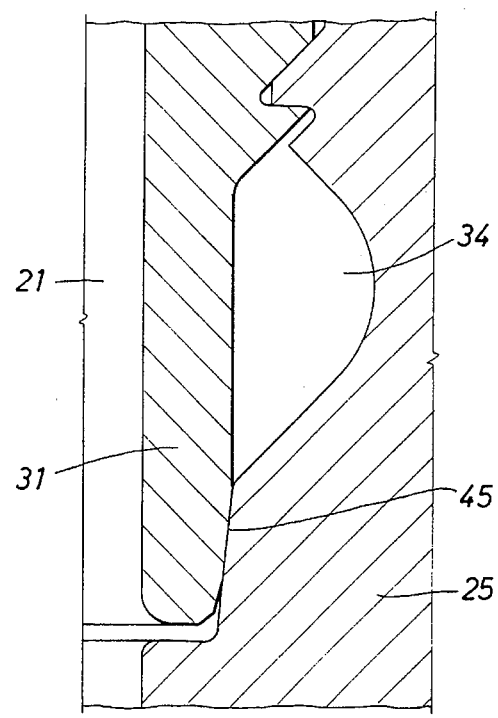
FIG. 6 is a view, taking in enlarged cross section, of the sealing means of FIG. 2 between the nose of the pin and the inner wall of the box below the threads thereof.

A second seal recessed within the body of the connector is provided for the same purpose by means of an O-ring 38 adapted to be mounted in a circumferential O-ring groove 39 formed adjacent the pin shoulder 36 as illustrated in FIGS. 3 and 5. With the pin and box made up in threaded connection (FIG. 2), the lip 35 at the nose of the box closes the O-ring groove 39 and compresses the O-ring 38 between the inner face 41 of the lip 35 and the wall of the groove 39. If desired, the face 41 of the box 35 may be tapered outwardly, as shown at 42, at an angle of from 5 to 25 degrees or more to the axis, thus providing gradual compressing of the O-ring as the nose 37 of the lip 35 approaches the pin shoulder 36 during make-up of the connector. The contacting faces of the shoulder 36 and the nose of the lip 37 form one fluid-tight seal within the connector, while the compressed O-ring 38 between the pin and the box forms a second seal. The O-ring 38 is made of a long-lasting (say, 20 years) compressible and resilient material adapted to be compressed up to 25% or more and maintain a fluid-tight seal.

A third recessed seal is formed between the inner surface 41 of the lip 35 of the box and the outer surface of a shoulder 43 formed circumferentially on the outer wall of the pin 24 adjacent the O-ring groove 39 and the redirection groove 33. The inner face 41 of the lip 35 of the box and the outer face of the shoulder 43 are angled at substantially the same angle and are dimensioned such that they are in face-to-face contact to form a metal-to-metal fluid-tight pressure energized metal-to-metal seal when the connector is made up, as shown at 44 in FIG. 5. If desired, in order to achieve a better seal, the angle between the pin metal-to-metal seal and box metal-to-metal seal may be slightly mismatched (in this case 10 degrees and 12 degrees) in order to achieve better initial "burnishing" and contact stresses over a smaller area of the contacting surfaces. Thus, the contacting surfaces of the metal-to-metal seal at 44 may differ from about 0.5 to 4 degrees to the axis of the connector to achieve better sealing results.

To gain greater compression on the O-ring seal 38 and the metal-to-metal seal 44, the contacting faces of the shoulder 36 and the end of lip 37 are formed at a selected back-angle (say, from 5 to 25 degrees from a radial line) to form camming surfaces whereby when additional torque is applied to the threaded sections of the pin and box to tighten the connection, the nose end 37 of the lip 35 will be cammed radially inwardly to add greater pressure against the metal-to-metal seal. Thus, it may be seen that the radially sliding surfaces between the nose end 37 of lip 35 and that of the shoulder 36 form camming means to set the seals 38 and 44 more tightly.

A third metal-to-metal seal 45 is formed between the pin 24 and box 25 at the other end of the threads 27–29 to prevent a fluid in the bore 21 of the connector from coming in contact with and corroding the threads or escaping pressure from pipe (maintains well control). The enlarged bore diameter 32 of the box 25 is provided, below the thread-load redirection groove 34, with a short wall section which is dimensioned to fit in face-to-face contact with the outer face of the lip 31 at the nose of the pin 24 to form the metal-to-metal seal 45 when the connector is in its operational position. As the pressure of a fluid within the bore 21 of the connector increases, the lip 31 is able to flex outwardly resulting in greater metal-to-metal sealing of seal 45. This also occurs in reverse for the outer metal-to-metal seal to prevent seawater ingress.

Figure 4:
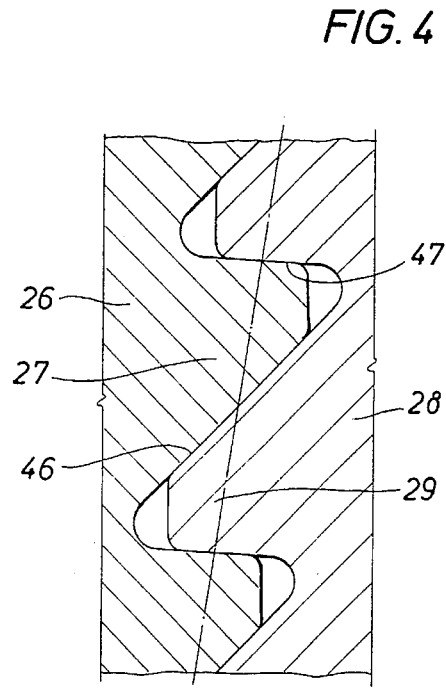
FIG. 4 is a view, taken in enlarged cross section, illustrating the pin-and-box thread design when in engagement, as shown in FIG. 2.

For a connector of the present invention to be used in an offshore pipe riser subjected to ocean forces and conditions, it is preferred that there be about 2 to 4 threads per inch for a connector to be used for 9-5/8ths-inch diameter pipe sections. The stabbing flanks of the threads 27 and 28 are preferably 45 degrees (40 to 60-degree range) to the axis of the connector for ease in making up a vertical string of pipe. The load flanks 47 of the threads 27 (FIG. 4) are sloped outwardly and downwardly at an angle of from 1 to 5 degrees, preferably 3 degrees, to a plane taken normal to the axis of the connector to aid in uncoupling a connector. A radiused gap 48 is provided between the root and crests of threads 27 and 28 to obviate stress damage, either static or cyclic. There is no open space between the flanks of the threads resulting in a connector having radial as well as axial interference in the mating threads.

As may be seen in FIG. 2, the wall thickness of the pin 24 and box 25 is much greater than the wall of the pipe 22, 23 to which they are welded. This is to accommodate the long threaded section 26, 28 and the sealing means at each end of the threads and other design features. The connector 20 is contoured on its outer wall to provide thickness transition areas, as at 48 and 49, which are designed to reduce stress concentration. These curved areas may be elliptical in form or be of two or more radii which, preferably, approximate an elliptical profile. The upper part of area 49 is preferably in the form of a lifting shoulder 50 on the box 25 which may be employed to receive pipe elevators when lowering pipe riser 16 to an underwater well 15 (FIG. 1). Also, the outer surface of the pin 24 above the shoulder 26 is provided with a tong surface 51 for accommodating pipe tongs or other make-up or torque-applying apparatus when connecting the pin and box together. In a like manner, the outer surface of the box 25 is provided with a similar tong surface 52 of suitable length for the same purpose. For a connector of the size described above the tong surfaces 51 and 52 would be about 6 inches long. Having long surfaces on the connector precludes having to put tongs on pipe itself which (a) prevents damaging corrosion protection coating on pipe, (b) prevents leaving marks, or stress raisers, on or near welds, reducing their fatigue life, and (c) prevents interference of tongs with bracelet anodes or vertical load support devices.

The threaded connector has been described hereinabove for connecting together sections of pipe which are vertically positioned in the ocean. A rugged connector is needed since the load on the pipe riser is calculated to be 670 Kips on location in 3,000 feet of water. It is to be understood that the present connector can be used to connect together sections of pipe in a horizontal pipeline or in a pipeline being installed in a J-lay fashion for quick make-up of a pipeline where offshore welding is not desired due to the lost time in inspection of the weld by X-ray or other means.

What is claimed is:

1. A multiple-seal threaded pipe-riser connector having a smooth bore therethrough of a diameter equal to the inner diameter of an elongated pipe made up of a plurality of pipe sections, said connector in its operational mode comprising:

a tapered pin member having a thread formed thereon over a central portion of said tapered surface, a sealing lip extending axially from a small-diameter end of the threaded portion of the pin member, an interference shoulder extending radially at the large-diameter end of the threaded portion of the pin member, and a base;

a circumferentially recessed thread-load redirection groove in the outer surface of the pin member and being of a depth greater than the depth of the threads and adjacent to the large-diameter end of the thread portion thereof;

a box member adapted to threadedly receive said pin member and having a body, an end face, and having an extending sealing lip for engaging the sealing surface means at the base of said tapered pin member;

recessed sealing surface means inside of the sealing surface means at the base of said tapered pin member, said recessed sealing surface means formed circumferentially in the body of said pin member adjacent said redirection groove, said sealing surface means including an axial interference shoulder;

a portion of said box member having formed therein a surface tapered inwardly away from the sealing lip for a portion of the body of the box member, a thread formed on said tapered portion of the box member of a size to operationally engage the threaded portion of the pin member;

a circumferentially recessed thread-load redirection groove formed in the wall of the box member adjacent the small diameter end of the thread portion thereof and being of a depth greater than the threads;

recessed sealing surface means formed circumferentially in the inner wall of said box member adjacent and axially displaced from said redirection groove thereof, said recessed sealing surface means being of a size to receive the sealing lip of the pin member; and sealing surface means on the end face of the sealing lip of said box member for engaging the interference shoulder of said pin member.

2. The multiple-seal connector of claim 1 wherein each of the box and pin members has an end of said connector away from the threadedly-engaged ends thereof which is reduced in wall thickness to that of the pipe sections used.

3. The connector of claim 2 wherein the reduction in diameter of the outer surface configuration from the center to the ends of the connector is in the form of gradual curving or elliptically profiled surfaces.

4. The connector of claim 3 including a load shoulder formed on the outer surface of the box member at the point of the start of reduction of the larger diameter portion of the connector.

5. The connector of claim 1 wherein the sealing lips of the box member and pin member are dimensioned such that they are in metal-to-metal sealing engagement with the sealing surface means of said pin member and box member, respectively, and form fluid-tight metal-to-metal seals.

6. The connector of claim 5 including an O-ring groove formed in the pin member at the inner diameter of the radially-extending axial interference shoulder, and an O-ring in said O-ring groove, said O-ring having a diameter larger than the depth of said groove so as to be operationally compressed between the bottom of the groove and the inner surface of the sealing lip of the box member when the end of said sealing lip of the box member engages the interference shoulder of said pin member in a fluid-tight manner.

7. The connector of claim 6 wherein the engaging face of the interference shoulder and the end face of the sealing lip of the box are beveled at a back angle to a degree sufficient to form camming surfaces whereby added torque applied to the threaded connector causes the camming surfaces to force the sealing lip of the box member inwardly to additionally compress the O-ring seal and the adjacent metal-to-metal seal.

8. The threaded connector of claim 5 wherein the threaded tapered portions of said pin member and said box member between the thread-load redirection grooves thereof, comprise threads formed with a stabbing flank longer than the load flank which is formed at a back angle of up to 5 degrees when viewed with regard to a radial line taken through said pin member and box member.

9. The threaded connector of claim 8 wherein the stabbing flanks of both the pin member and box member threads are formed to slope at an angle of from 40 degrees to 60 degrees from the axis and away from the ends of the pin member and box member, respectively.

10. The threaded connector of claim 9 wherein the root and crests of the threads are selectively modified such that the crest of each thread on the box member and pin member, when made up, are spaced from the roots of the threads which they engage, whereby a closed space is formed at the root of each thread.

11. The connector of claim 5 wherein frictional anti-backoff anchoring means are formed by the metal-to-metal seals formed between the pin member and the box member.

12. A multiple-seal threaded pipe-riser connector for use in deep water oil production operations, said connector having a smooth bore of a diameter equal to that of the internal diameter of adjacent sections of a pipe-riser to which they are to be attached, said threaded connector comprising:

a tubular pin member having first and second ends and a body, said first end adapted to be welded to one end of a pipe riser section, a portion of said pin member having a tapered central portion adapted to be threaded, a thread formed on said central portion of said pin member which tapers radially inwardly, a thin-walled sealing lip formed at the second end of said pin member and extending axially from the end of the threaded portion, and being provided with first sealing surface means;

a circumferential thread-load redirection groove formed in the surface of the pin member adjacent the largest diameter threads on the pin member;

second sealing surface means formed in the body of said pin member adjacent to and axially displaced from said thread-load redirection groove, comprising a circumferential groove and a O-ring seated therein;

an axially extending recessed shoulder formed in the pin member adjacent to and axially displaced from said second sealing surface means;

a tubular box member having first and second ends, said first end adapted to be welded to one end of a pipe riser section and adapted to be connected to a pin member of another pipe riser section;

a thin-walled sealing lip formed at the second end of the box member and being of a size, when coupled to the pin member, to extend over the thread-load redirection groove and second box member sealing surface means and to seat on the recessed shoulder formed in the pin member;

third sealing surface means formed on the inner wall of the lip of the box member to engage the axially extending recessed shoulder of the pin member;

a portion of the box member adjacent the lip having a bore formed to taper radially outwardly toward the lip;

a thread formed on the tapered bore section, said thread being of a size to threadedly engage the thread formed on the pin member;

a thread-load redirection groove formed in the inner surface of the bore of the box member adjacent the box thread; and fourth sealing surface means formed on the inner surface of the bore of the box member adjacent the redirection groove axially positioned to engage the first sealing surface means of the pin member.

13. The connector of claim 1 wherein the recessed sealing surface means of the pin member adjacent the redirection groove thereof forms a metal-to-metal circumferential seal of non-parallel contacting faces.

14. The connector of claim 13 wherein the contacting faces of the metal-to-metal seal may differ from about 0.5 to 4 degrees relative to the axis of the connector.

* * * * *